US011425192B2

(12) United States Patent
Barnum et al.

(10) Patent No.: US 11,425,192 B2
(45) Date of Patent: *Aug. 23, 2022

(54) SYSTEMS AND METHODS FOR COMMUNICATING WITH A UNIQUE IDENTIFIER

(71) Applicant: Capital One Services, LLC, McLean, VA (US)

(72) Inventors: Eric K. Barnum, McLean, VA (US); Anthony Reynolds, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/329,949

(22) Filed: May 25, 2021

(65) Prior Publication Data

US 2021/0281634 A1 Sep. 9, 2021

Related U.S. Application Data

(63) Continuation of application No. 16/295,574, filed on Mar. 7, 2019, now Pat. No. 11,019,134, which is a continuation of application No. 16/108,938, filed on Aug. 22, 2018, now Pat. No. 10,271,188, which is a continuation of application No. 14/719,803, filed on May 22, 2015, now Pat. No. 10,085,131.

(60) Provisional application No. 62/002,419, filed on May 23, 2014, provisional application No. 62/022,738, filed on Jul. 10, 2014.

(51) Int. Cl.
*H04L 67/10* (2022.01)

(52) U.S. Cl.
CPC .................................. *H04L 67/10* (2013.01)

(58) Field of Classification Search
CPC ......... H04L 67/10; H04L 67/303; H04W 4/21
See application file for complete search history.

(56) References Cited

U.S. PATENT DOCUMENTS

| | | | | |
|---|---|---|---|---|
| 2009/0298514 A1* | 12/2009 | Ullah | ................... | H04L 67/306 340/572.1 |
| 2013/0041976 A1* | 2/2013 | Hendricks | ............... | G06Q 30/02 709/217 |
| 2013/0196602 A1* | 8/2013 | Rothschild | ......... | H04N 1/00103 455/41.2 |
| 2013/0297551 A1* | 11/2013 | Smith | ................... | H04W 4/029 706/48 |
| 2014/0244834 A1* | 8/2014 | Guedalia | ................. | H04L 67/51 709/224 |
| 2014/0282102 A1* | 9/2014 | Avrahami | ............... | H04W 4/00 715/753 |

* cited by examiner

*Primary Examiner* — Michael A Keller
*Assistant Examiner* — Jsing Forng Lin
(74) *Attorney, Agent, or Firm* — Perkins Coie LLP (57) ABSTRACT

A system for device communication is disclosed. The system may include one or more memory devices storing instructions and one or more processors configured to execute the instructions to transmit a first unique identifier to a wave device, and receive a second unique identifier from the wave device. Further, the first unique identifier may exclusively identify a person, and the second unique identifier may exclusively identify a first wave receiver associated with a person, an entity, a place, or an object. In addition, at least the first unique identifier may be transmitted to the wave device based on an indication of a proximity between the first person and the first wave receiver.

20 Claims, 6 Drawing Sheets

SYSTEMS AND METHODS FOR COMMUNICATING WITH A UNIQUE IDENTIFIER

PRIORITY CLAIM

This application is a continuation of U.S. patent application Ser. No. 16/295,574, filed on Mar. 7, 2019, which is a continuation of U.S. patent application Ser. No. 16/108,938, filed on Aug. 22, 2018, which is a continuation of U.S. patent application Ser. No. 14/719,803, filed on May 22, 2015, which claims the benefit of priority under 35 U.S.C. § 119 to U.S. Provisional Patent Application No. 62/002,419 filed on May 23, 2014, and entitled "Systems and Methods for Communicating with a Unique Identifier" and U.S. Provisional Patent Application No. 62/022,738 filed on Jul. 10, 2014, and entitled "Systems and Methods for Providing an Interactive Community Through Device Communication." The aforementioned applications are incorporated herein by reference in their entirety.

TECHNICAL FIELD

The disclosed embodiments generally relate to systems and methods for device communication, and more particularly, systems and methods for providing device communications based on one or more unique identifiers.

BACKGROUND

Computers have become integral to the way people communicate with one another. In particular, certain computer-enabled communications, such as email, text messaging, social media, and the like, have become the primary means through which certain people, such as friends, family, coworkers, etc., communicate. However, in general, these types of communication require a person to stop and consider what it is they want to communicate before doing so.

Computers also have the capability to gather information about an individual automatically. For example, mobile devices are able to determine location-based information, such as the location of the device operated by the user and what other user-operated devices are nearby. In this way, computers are able to gather information associated with the person or entity operating these devices in order to contextualize the gathered information. While some forms of communication currently include background information along with a message (e.g., a social media post that identifies the poster's location), current systems and processes do not adequately utilize contextual information to facilitate communication.

SUMMARY

The disclosed embodiments include systems and methods that enable communication through the transmission and/or receipt of a unique identifier.

Consistent with a disclosed embodiment, a system for device communication is provided. The system may include one or more memory devices storing instructions and one or more processors configured to execute the instructions to transmit a first unique identifier to a wave device, and receive a second unique identifier from the wave device. Further, the first unique identifier may exclusively identify a person, and the second unique identifier may exclusively identify a first wave receiver, the first wave receiver associated with a person, an entity, a place, or an object. In addition, at least the first unique identifier may be transmitted to the wave device based on an indication of a proximity between the first person and the first wave receiver.

Consistent with another disclosed embodiment, a computer-implemented method of device communication is provided. The method may include transmitting, by one or more processors, a first unique identifier to a wave device, and receiving a second unique identifier from the wave device. The method may also include receiving a payload from the wave device, wherein the payload includes a list of unique identifiers previously received by the wave device. The method may further include adding the second unique identifier and the list of unique identifiers previously received by the wave device to a list of received unique identifiers.

Consistent with yet another disclosed embodiment, a data collection device is provided. The data collection device may include one or more memory devices storing instructions, and one or more processors configured to execute the instructions to receive a unique identifier from a wave device. The one or more processors may be further configured to execute the instructions to determine that the unique identifier is included in a list of received unique identifiers, determine an action to be triggered based on the unique identifier, and provide information to the wave device for triggering the action.

Although disclosed embodiments are discussed primarily in the context of mobile devices and software instructions that are executed by those mobile devices, other implementations are contemplated. For example, disclosed embodiments may include software instructions that are executed by a computing system, such as a desktop computer, a laptop, etc. Moreover, the configuration and architecture, etc. of the computing systems, mobile or non-mobile, are not limiting to the disclosed embodiments. Systems or components that execute software instructions to perform one or more operations consistent with the disclosed embodiments and/or store information generated and/or used by the disclosed embodiments, may be particularly configured to perform the one or more particular operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments pertain to device communication that is facilitated through the use of one or more unique identifiers. A unique identifier may be any information (e.g., an alphanumeric string) that is unique to and exclusively identifies an associated person, entity (e.g., business, merchant, corporation, community, event, etc.), place (e.g., building, room, home, landmark, monument, country, city, neighborhood, street, etc.), and/or object (e.g., product, vehicle, apparel, etc.).

The disclosed embodiments may execute software that, when executed by one or more processors, perform processes that provide unique identifier(s) that may be used to facilitate communications between remote devices or other components. For instance, consistent with disclosed embodiments, interactions that occur between one or more people, entities, places, and/or objects may include the transmission and/or receipt of one or more unique identifiers via system components executing software to perform processes that provide such communications.

For example, the disclosed embodiments may allow automated communications between devices that reflect interactions between one or more people, entities, places, and/or objects. These interactions may include, for example, co-workers having such devices on their person passing each other in the hallway, drivers of vehicles including such devices passing each other on the street, a customer having such a device on their person entering a merchant location including another such device, a person having such a device entering a room configured with another such device, a person having such a device in proximity of a television, signage, or other type of display device showing an advertisement, a group of people having respective such devices attending a meeting, a person having such a device who is attending a concert, a tourist having such a device visiting a landmark, a passenger entering a vehicle, and the like. In some embodiments, an interaction may be recorded after an interaction between one or more people, entities, places, and/or objects, such as when a person involved in the interaction does not have a device with them during the interaction, and instead inputs the information at a later time.

Through receipt and transmission of unique identifiers, interactions may be enhanced to include the sharing, recording, and/or analyzing of information, including information identifying that the interaction occurred, whether or not any people involved in the interaction were aware of it.

In one aspect, an interaction may result in a computing device receiving a unique identifier. For example, a person may be involved in an interaction that results in an associated computing device receiving a unique identifier. The computing device may be configured to perform one or more processes to use the unique identifier in manners consistent with disclosed embodiments. For example, the computing device may receive and store the received unique identifier. In another aspect, the computing device may be configured to receive and store contextual information, such as when (e.g., time, date, day of week, month, year, etc.) and where (e.g., geographic location information, etc.) the unique identifier was received. The computing device may also perform a process to match the unique identifier to stored information, which the computing device may use to trigger an action (e.g., display information to a user). The computing device may also add the unique identifier to a historical list of received unique identifiers.

In another aspect, the disclosed embodiments may be configured to identify an interaction, such as those exemplified above, which may result in a computing device transmitting a unique identifier to another device. For example, a person having a computing device configured in accordance with disclosed embodiments may be involved in an interaction that results in a unique identifier associated with the person being transmitted and received by another device. The receiving device may use the unique identifier to perform one or more processes, such as those described above. One or more of these processes may include forwarding the unique identifier to another device, which may also be configured to perform processes that use the unique identifier. This cycle may continue, such that a unique identifier may be involved in any number of interactions that may or may not involve the underlying person, entity, place, or object that is associated with the unique identifier. For instance, the disclosed embodiments may include systems and methods that generate a unique identifier that may be provided from a first device to a second device based on a determined interaction, the provision of the unique identifier occurring during a first level of communications. In turn, the disclosed embodiments may include configurations where the second device may further provide the unique identifier to a third device during a second level of communications, and so on.

A computing device may be configured to receive and/or transmit a unique identifier in a variety of manners. In one exemplary embodiment, two or more proximate devices may automatically communicate with each other to exchange unique identifiers. A first device may automatically connect to a second device (e.g., via a network or direct connection between the first and second devices using, for example, Bluetooth®, WiFi, RFID, etc.) when the devices are within a certain proximity to each other. The first device may "wave" to the second device, including sending a unique identifier to the second device. The second device may "wave back" to the first device, including sending a different unique identifier back to the first device.

Each of the first and second devices may perform one or more processes using the respectively received unique identifier. In addition, the first and second devices may exchange additional data. For example, the first and second devices may additionally or alternatively exchange one or more messages. In another example, the first and second devices may exchange respective historical lists of received unique identifiers, thereby transmitting unique identifiers that are not associated with any people, entities, places, or objects that are involved in the interaction.

Consistent with disclosed embodiments, a data collection device may store information in association with one or more unique identifiers. For example, the data collection device may store software instructions that are executed by a processor to perform an action that may be triggered as a result of a computing device receiving a particular unique identifier. In another example, the data collection device may store a user profile associated with a unique identifier. The data collection device may store as part of the user profile additional information that a computing device may use to determine an action to be triggered when another unique identifier is received. The data collection device may also store as part of the user profile a historical list of received unique identifiers, as well as information associated with computing devices that have received the unique identifier associated with the user profile. In this way, a person may operate a computing device to find out about interactions that involved their unique identifier, including interactions with which they were not directly involved.

Figure 1:
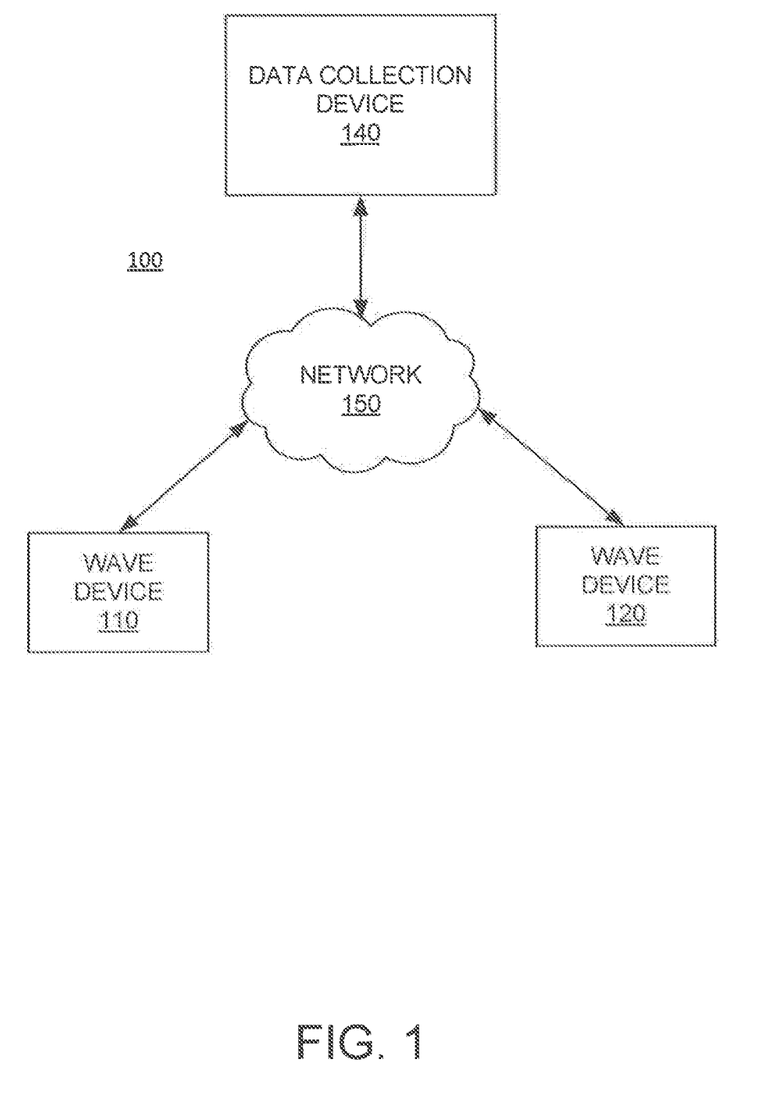
FIG. 1 illustrates an exemplary system consistent with disclosed embodiments.

FIG. 1 is a diagram illustrating an exemplary system 100 for performing one or more operations consistent with the disclosed embodiments. In one embodiment, system 100 may include a plurality of wave devices 110 and 120, a data collection device 140, and a network 150. The components and arrangement of the components included in system 100 may vary. Thus, system 100 may further include other components that perform or assist in the performance of one or more processes consistent with the disclosed embodiments. For example, while two wave devices 110 and 120 are depicted, it should be understood that any number of wave devices 120 may be included in system 100.

Wave devices 110 and 120 may each be one or more computing devices that are configured to execute software instructions for performing one or more operations consistent with the disclosed embodiments. In an exemplary embodiment, a "wave device" is any device that is capable of receiving and/or transmitting a unique identifier. Wave devices 110, 120 may be any type of computing device, such as a mobile device (e.g., smart phone, tablet, etc.), laptop, desktop computer, server, beacon, sensor device, and/or any device capable of communicating with another device, such as a Bluetooth®-enabled device, WiFi-enabled device, RFID chip, etc.

In some embodiments, wave device 110 may include one or more processors configured to execute software instructions stored in memory, such as memory included in wave device 110. Wave device 110 may include software that when executed by one or more processors performs known Internet-related communications and content display processes. For instance, wave device 110 may execute browser software that generates and displays interfaces including content on a display device included in, or connected to, wave device 110.

Wave device 110 may be configured to store a unique identifier associated with a person, entity, place, or object. Wave device 110 may store the unique identifier in a memory device. Wave device 110 may store the unique identifier as part of a unique identifier (UID) profile. Wave device 110 may be configured to transmit the unique identifier to other devices, such as wave device 120 and/or data collection device 140, via network 150.

In some embodiments, wave device 120 may also include one or more processors configured to execute software instructions stored in memory, such as memory included in wave device 120. Wave device 120 may comprise components and perform operations that are the same or similar to wave device 110. For example, wave device 120 may be configured to store a unique identifier associated with a different person, entity, place, or object. Wave device may also store the unique identifier as part of a UID profile and be configured to transmit the unique identifier to other devices, such as wave device 110 and/or data collection device 140, via network 150. It should be understood however, that wave devices 110 and 120 may be configured differently. For example, one or more of wave devices 110, 120 may be configured to only receive or only transmit a unique identifier.

Data collection device 140 may include one or more computing systems that are configured to execute software instructions stored on one or more memory devices to perform one or more operations consistent with the disclosed embodiments. For example, data collection device 140 may include one or more memory device(s) storing data and software instructions and one or more processor(s) configured to use the data and execute the software instructions to perform server-based functions and operations known to those skilled in the art and related to the function and operations associated with data collection device 140. Moreover, in certain embodiments, data collection device 140 may be configured to execute software instructions that interact with software program(s) stored and executed by wave device 110 and/or wave device 120, such as a mobile application that is executed on a mobile device.

Data collection device 140 may be a general purpose computer, a mainframe computer, or any combination of these components. In certain embodiments, data collection device 140 (or a system including data collection device 140) may be configured as a particular apparatus, system, and the like based on the storage, execution, and/or implementation of the software instructions that perform one or more operations consistent with the disclosed embodiments. Data collection device 140 may be standalone, or it may be part of a subsystem, which may be part of a larger system. For example, data collection device 140 may represent distributed servers that are remotely located and communicate over a network (e.g., network 150).

In an exemplary embodiment, data collection device 140 may include or may connect to one or more storage devices configured to store data and/or software instructions used by one or more processors of data collection device 140 to perform operations consistent with disclosed embodiments. For example, data collection device 140 may include memory configured to store one or more software programs that performs several functions when executed by a processor. The disclosed embodiments are not limited to separate programs or computers configured to perform dedicated tasks. For example, data collection device 140 may include memory that stores a single program or multiple programs. Additionally, data collection device 140 may execute one or more programs located remotely from data collection device 140. For example, data collection device 140 may access one or more remote programs stored in memory of a remote component that, when executed, perform operations consistent with the disclosed embodiments.

In an exemplary embodiment, data collection device 140 may store information associated with unique identifiers, such as UID profiles. The UID profiles may include information identifying a person, entity, place, or object that is associated with the UID profile and the associated unique identifier. The UID profiles may also include information associated with interactions involving transmission of the associated unique identifier and/or receipt of another unique identifier. In addition, the UID profiles may include instructions for one or more actions to be triggered based on particular interactions that occur. For example, UID profiles may include instructions for actions to be triggered when a computing device receives the associated unique identifier and/or actions to be triggered when a computing device associated with the unique identifier receives another unique identifier.

In certain embodiments, data collection device 140 may be a component of one or more of wave device 110 and wave device 120. For example, wave device 110 and/or wave device 120 may include components configured to perform one or more of the processes of data collection device 140. For instance, wave device 120 may be configured to store information associated with a UID profile.

In certain embodiments, wave device 110 and/or wave device 120 may connect to data collection device 140 to retrieve information stored therein. For example, wave device 110 may access information associated with interactions that occurred that involved a transmission and/or receipt of a unique identifier, such as transmission of a unique identifier associated with a person operating wave device 110. In another example, wave device 110 may connect to data collection device 140 to provide information to be stored by data collection device 140.

Network 150 may be any type of network configured to provide communications between components of system 100. For example, network 150 may be any type of network (including infrastructure) that provides communications, exchanges information, and/or facilitates the exchange of information, such as a Wide Area Network, a Local Area Network, a direct connection, or other suitable connection(s) that enables the sending and receiving of information between the components of system 100. For example, network 150 may facilitate connection via Bluetooth®, WIFI, RFID, NFC, radio. Ethernet, Internet, magnetic devices, infrared technology, etc.

Figure 2:
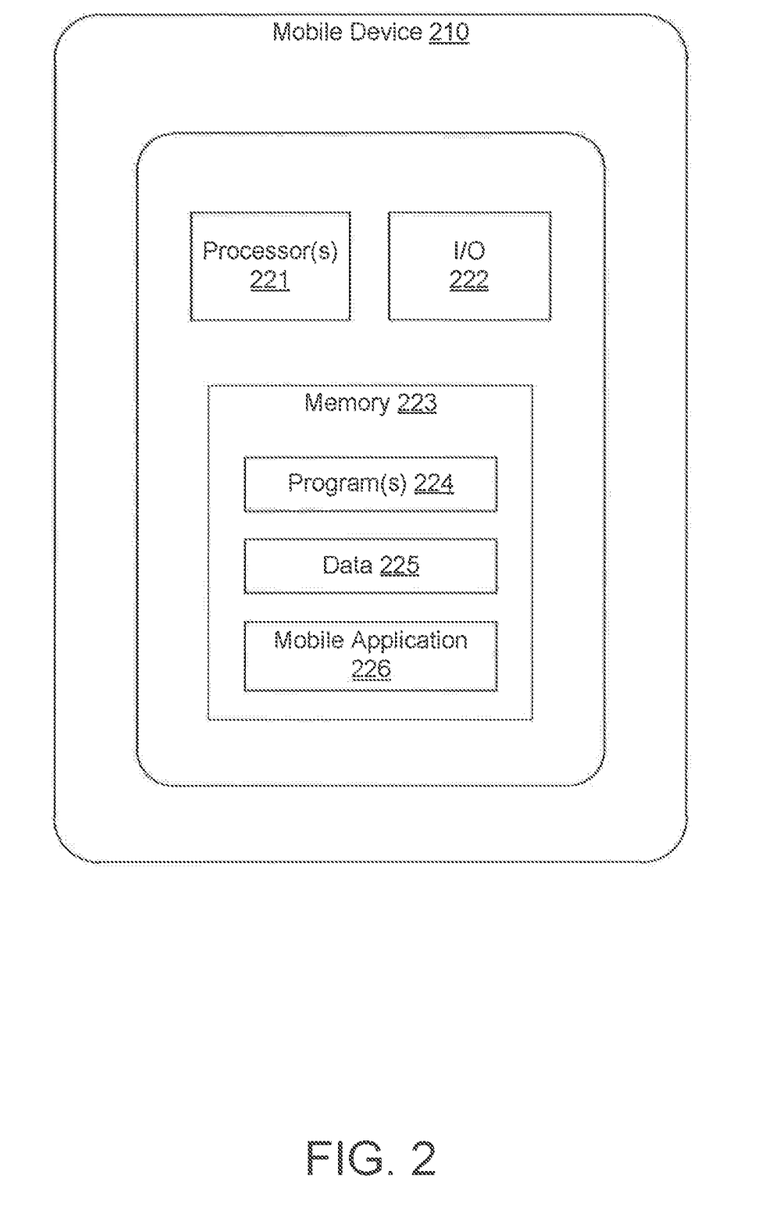
FIG. 2 is a block diagram of an exemplary client device computing system, consistent with disclosed embodiments.

FIG. 2 shows an exemplary mobile device 210, consistent with disclosed embodiments. In certain embodiments, mobile device 210 may embody wave device 110 and/or 120. It should be understood, however, that mobile device 210 may also embody data collection device 140 and/or a component not shown in FIG. 1. In one embodiment, mobile device 210 may include one or more processors 221, one or more input/output (I/O) devices 222, and one or more memories 223. In one embodiment, mobile device 210 may take the form of a general purpose computer, a mainframe computer, or any combination of these components. In some embodiments, mobile device 210 may be a personal computing device, such as a smartphone, tablet, laptop, desktop computer, etc.

In certain embodiments, mobile device 210 (or a system including mobile device 210) may be configured as a particular apparatus, system, and the like based on the storage, execution, and/or implementation of the software instructions that perform one or more operations consistent with the disclosed embodiments. Mobile device 210 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in mobile device 210.

I/O devices 222 may be one or more device that is configured to allow data to be received and/or transmitted by mobile device 210. I/O devices 222 may include one or more digital and/or analog communication devices that allow mobile device 210 to communicate with other machines and devices, such as other components of system 100.

Memory 223 may include one or more storage devices configured to store instructions used by processor 221 to perform functions related to the disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of mobile device 210, or program 224 could comprise multiple programs. Additionally, processor(s) 221 may execute one or more programs located remotely from mobile device 210. For example, mobile device 210, may access one or more remote programs that, when executed, perform functions related to certain disclosed embodiments.

Memory 223 may also store data 225 that may reflect any type of information in any format that the system may use to perform operations consistent with the disclosed embodiments. For example, data 225 may include a unique identifier associated only a particular mobile device 210. Data 225 may also include stored information, such as information associated with an event to be triggered based on data communications received by mobile device 210.

In certain embodiments, memory 223 may store a mobile application 226. Mobile application 226 may be one or more programs or software instructions that, when executed by processor(s) 221, perform one or more operations associated with an entity associated with mobile application 226, such as a merchant or financial service provider. For example, mobile application 226 may be a mobile application that is stored in a mobile device (e.g., mobile device 210) that performs operations and generates interface(s) that are displayed on a display device of mobile device 210. The interface(s) may be configured to present information and provide request(s) that elicit input from a user. Mobile device 210 may be configured with known input hardware and software components that accept input from a user through known mobile device mechanisms, such as touch screen technologies, voice input, keypad entry, etc.

Mobile application 326 may be configured to use information to generate information, analyze and determine condition(s), generate results based on those condition(s), and provide data and interface(s) including the data. In certain aspects, mobile application 226 may be configured to perform one or more processes consistent with the disclosed embodiments, such as, for example, determining information to be displayed to a user, stored in a memory, and/or transmitted to another device as a result of receiving a unique identifier.

Figure 3:
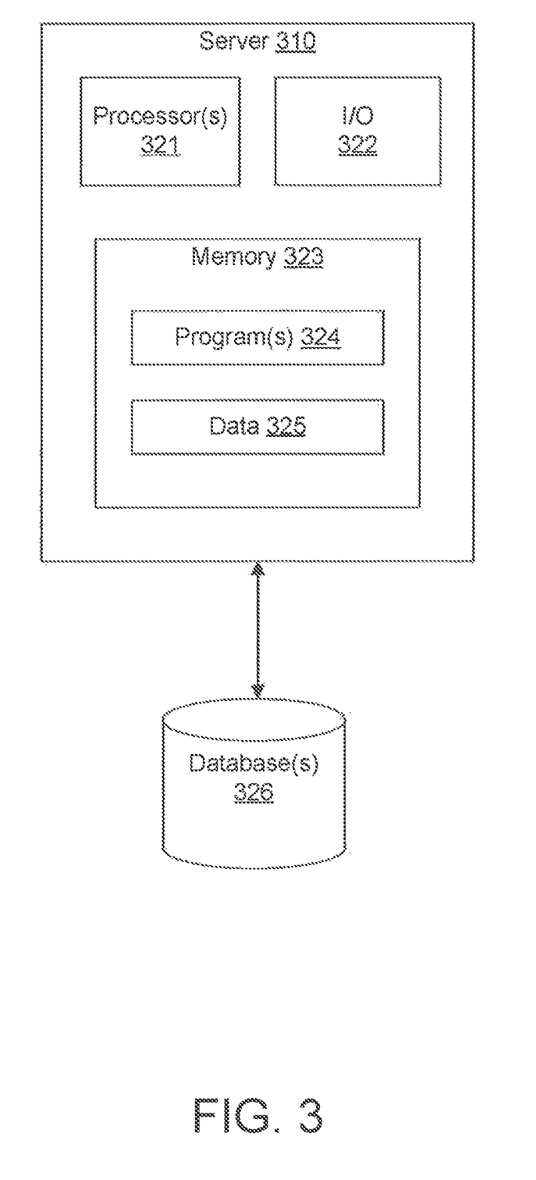
FIG. 3 is a block diagram of an exemplary computing system, consistent with disclosed embodiments.

FIG. 3 shows an exemplary computing system including server 310, consistent with disclosed embodiments. In an exemplary embodiment, server 310 may embody data collection device 140. It should be understood, however, that the configuration and components of server 310 may additionally or alternatively represent that of wave device 110, wave device 120, and/or a component not shown in FIG. 1.

In one embodiment, server 310 may include one or more processors 321, one or more input/output (I/O) devices 322, and one or more memories 323. Alternatively, server 310 may take the form of a general purpose computer, a mainframe computer, or any combination of these components. In certain embodiments, server 310 (or a system including server 310) may be configured as a particular apparatus, system, and the like based on the storage, execution, and/or implementation of the software instructions that perform one or more operations consistent with the disclosed embodiments. Server 310 may be standalone, or it may be part of a subsystem, which may be part of a larger system.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 310.

I/O devices 322 may be one or more device that is configured to allow data to be received and/or transmitted by server 310. I/O devices 322 may include one or more digital and/or analog communication devices that allow server 310 to communicate with other machines and devices, such as other components of systems 100.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor(s) 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example server 310, may access one or more remote programs that, when executed, perform functions related to certain disclosed embodiments.

Memory 323 may also store data 325 that may reflect any type of information in any format that the system may use to perform operations consistent with the disclosed embodiments. For example data 325 may include stored user information associated with one or more unique identifiers.

Server 310 may also be communicatively connected to one or more database(s) 326. Server 310 may be communicatively connected to database(s) 326 through network 150. Database 326 may include one or more memory devices that store information and are accessed and/or managed through server 310. By way of example, database(s) 326 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 310 as exemplified in FIG. 3 may include database 326. Alternatively, database 326 may be located remotely from the server 310. Database 326 may include computing components (e.g., database management system, database server, etc.) configured to receive and process requests for data stored in memory devices of database(s) 326 and to provide data from database 326.

Wave devices 110 and 120 may be configured as mobile device 210, server 310, or another computing device that includes one or more of the components of mobile device 210 and/or server 310. Regardless of their particular configuration, wave devices 110 and 120 may be configured to take part in a wave interaction. A "wave interaction" may be any interaction between a person, entity, place, or object and another person, entity, place, or object that results in a wave device receiving and/or transmitting a unique identifier.

For example, a person carrying wave device 110 may walk past a person carrying wave device 120. As a result, wave device 110 and wave device 120 may automatically connect to each other via network 150 (e.g., via a Bluetooth® connection) and exchange unique identifiers respectively stored thereon. It should be understood, however, that receipt and/or transmission of a unique identifier may not necessarily occur during an interaction. For example, a user may operate a computing device to manually transmit a unique identifier to another computing device after an interaction occurs.

While wave devices 110 and 120 have been described, it should be understood that any number of wave devices may be included in system 100. Each wave device may be configured to take part in a wave interaction to receive and/or transmit a unique identifier. Each wave device may be configured to subsequently perform one or more processes associated with the wave interaction. For example, each wave device may store information (e.g., in an associated memory, in data collection device 140, etc.) associated with the wave interaction, such as when and where the wave interaction occurred, as well as any unique identifiers received as a result of the wave interaction. In another example, each wave device may transmit additional information to another wave device as a result of a wave interaction.

Figure 4:
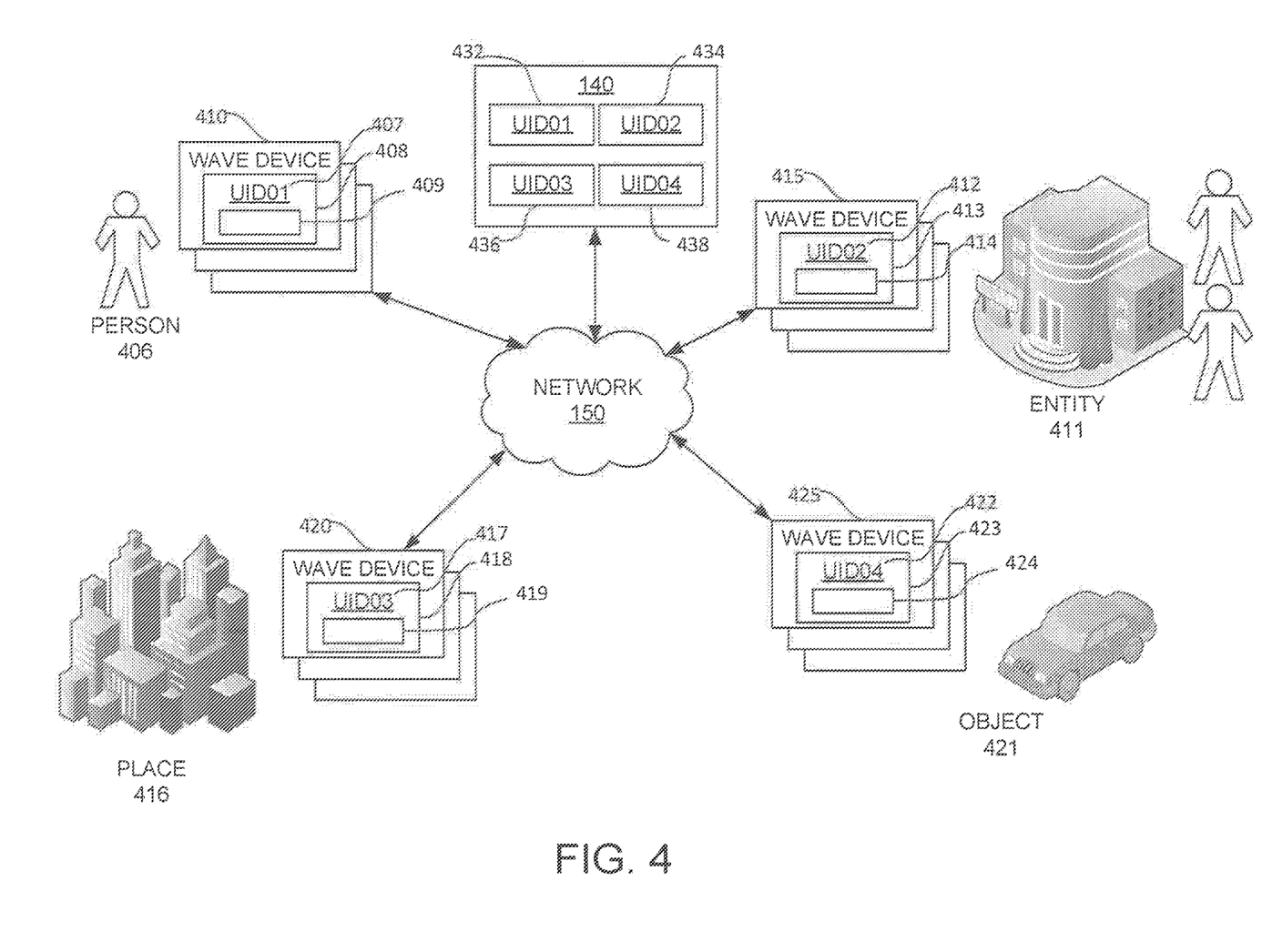
FIG. 4 illustrates an exemplary unique identifier system, consistent with disclosed embodiments.

FIG. 4 is an exemplary diagram of a unique identifier (UID) system 400 depicting an exemplary interrelationship between unique identifiers, UID profiles, wave devices, a data collection device, and people, entities, places, and objects associated with the unique identifiers. As has been described, a unique identifier may be any information that is unique to and exclusively identifies an associated person, entity, place, and/or object. For example, each unique identifier may be a systematically- and/or randomly-assigned alphanumeric string configured to be received, stored, and transmitted as data. In certain aspects, data collection device 140 may be configured to execute software instructions that perform unique identifier assigning processes that assign a person, place, entity or object with a unique identifier and store the information in a data structure stored in a memory device(s).

As exemplified in FIG. 4, data collection device 140 (or another component) may associate a person 406 with a unique identifier 407 (e.g., "UID01"). Unique identifier 407 may be "unique" to and exclusively identify person 406. Person 406 may also be associated with one or more wave devices 410. For example, person 406 may own, carry, possess, or otherwise control one or more computing devices configured to be used in a wave interaction to transmit unique identifier 407 to another device and/or receive another unique identifier.

One or more of wave devices 410 may be configured to store unique identifier 407 as part of a UID profile 408. UID profile 408 may include one or more programs and/or data stored in a memory associated with wave device 410 and configured to associate person 406, unique identifier 407 and wave device 410. By associating person 406, unique identifier 407, and wave device 410, interactions involving person 406 may be defined as wave interactions through wave device 410 transmitting unique identifier 407 to another wave device. For example, when person 406 moves to within a certain proximity of another person (an "interaction"), a wave device 410 may come into proximity with a wave device associated with the other person. Wave device 410 may connect to the other wave device and transmit unique identifier 407 to the other wave device (thus the interaction is a "wave interaction").

In some embodiments, UID profile 408 may include additional information associated with person 406 and/or unique identifier 407. For example, UID profile 408 may include a historical list of received unique identifiers ("UID receipt history"). For example, the UID receipt history may include all unique identifiers that were received by a wave device 410 as a result of a wave interaction involving person 406. It should be understood that UID receipt history may not be limited to unique identifiers received by one wave device 410, and instead may include all unique identifiers received by all wave devices 410 associated with person 406 and unique identifier 407.

In another example, UID profile 408 may include additional information configured to be transmitted to another wave device as a result of a wave interaction. For example, UID profile may include a payload 409. Payload 409 may include data that may be selectively transmitted to another device as a result of a wave interaction. For example, payload 409 may include a message to be transmitted to another wave device and used by the other wave device in one or more processes. The message may include, for example, textual data, image data, video data, audio data, program instructions, etc., which the other wave device may use to display a textual message, an image, a video, play audio, execute program instructions, etc.

In another example, payload 409 may include a UID receipt history. That is, in addition to transmitting unique identifier 407 to another wave device, a wave device 410 may transmit a UID receipt history as part of a payload 409. In this way, the other wave device may receive unique identifier 407 and a list of unique identifiers that were received as a result of wave interactions involving person 406.

In some embodiments, a wave device 410 may be configured to perform one or more processes to determine a payload 409 to be transmitted to another wave device as a result of a wave interaction. For example, a wave device 410 may customize payload 409 depending on other available information. In one example, wave device 410 may determine data to be included as part of a payload 409 based on time, date, and/or location data. In this way, wave device 410 may customize payloads 209 depending on when and where a corresponding wave interaction occurs.

In another example, wave device 410 may be configured to customize a payload 409 based on a unique identifier received as a result of a the corresponding wave interaction. For example, wave device 410 may match a received unique identifier to stored information and customize payload 409 based on the stored information. For example, wave device 410 may match a receive unique identifier to information identifying a person associated with the received unique identifier, and customize payload 409 to include a textual message that includes the identified person's name.

While only one person 406 is depicted, it should be understood that any number of people may be included in UID system 400. Each person may be associated with a unique identifier and one or more wave devices in substantially the same manner as person 406, unique identifier 407, and wave devices 410. As people interact with each other, wave interactions may occur between their wave devices, causing unique identifiers and payloads to be transmitted and/or received as a result.

UID system 400 may also include entities associated with unique identifiers and wave devices. As used herein, an "entity" refers to an organization of one or more people that is separately identifiable independent of the one or more people. For example, an entity may be, for example, a business, a merchant, a corporation, a brand, a community, an event, and/or the like.

As shown in FIG. 4, an entity 411 may be associated with a unique identifier 412 (e.g., "UID02"). Unique identifier 412 may be "unique" to and exclusively identify entity 411. Entity 411 may also be associated with one or more wave devices 415. For example, wave devices 415 may be arranged such that a wave interaction involving a wave device 415 reflects an interaction with entity 411. For example, a wave device 415 may be a computing device controlled by a person associated with entity 411, such as an employee, representative, official, etc. In another example, a wave device 415 may be a computing device located within a setting associated with entity 411, such as a place of business. Wave devices 415 may store a UID profile 413 that associates corresponding wave device 415 with unique identifier 412 and entity 411.

In one example, entity 411 may be a merchant. The merchant may be any entity that may offer any type of product or service. The merchant may include brick and mortar location(s) that a consumer may physically visit and purchase goods and services and/or office-type buildings. Such physical locations may include back and/or front-end computing components that store data and execute software instructions to perform operations consistent with disclosed embodiments, such as computers that are operated by employees of the merchant (e.g., back office systems, etc.). In some instances, the merchant may be a financial service provider, such as a bank, credit card issuer, or other type of financial service entity that offers, issues, generates, provides, manages, and/or maintains financial service accounts for one or more users.

Entity 411 (e.g., a person associated with entity 411) may position wave devices 415 such that they are configured to be involved in wave interactions with other wave devices. For example, in the example in which entity 411 is a merchant, the merchant may place a wave device 415 in a retail store location. The wave device 415 may be configured to communicate with other wave devices (e.g., wave devices 410) that enter the retail store to transmit unique identifier 412 to the other wave devices and/or receive a unique identifier from the other wave devices. In this way, interactions such as people entering a retail store may be wave interactions.

Wave interactions between a wave device 415 and another wave device (e.g., a wave device 410) may occur in a manner that is the same as or similar to the exemplary wave interactions described above with respect to wave devices 410. For example, in addition to the transmission and/or receipt of a unique identifier, wave interactions involving wave devices 415 may include transmission of a payload 414 stored as part of UID profile 413.

Payload 414 may include data to be transmitted to other wave devices to communicate additional information. For example, payload 414 may include a message to be transmitted to another wave device. In another example, payload 414 may include a UID receipt history that includes a list of unique identifiers received by wave device 415. Through transmission of payload 414 from a wave device 415 to another wave device, information associated with entity 411 may be communicated to people through wave interactions. For example, wave device 415 may transmit a greeting to a customer's wave device when the customer enters a retail store. In another example, wave device 415 may transmit a message that includes customized information, such as daily specials, coupons, hours of operation, wait times, etc.

UID system 400 may also include places associated with unique identifiers and wave devices. As used herein, a "place" refers to a physical location that has some identifiable feature that defines the location. Examples of a place may include a landmark, a monument, a country, a city, a neighborhood, a street, a building, a home, a room, and/or the like.

As shown in FIG. 4, a place 416 may be associated with a unique identifier 417 (e.g., "UID03"). Unique identifier 417 may be "unique" to and exclusively identify place 416. Place 416 may also be associated with one or more wave devices 420. For example, wave devices 420 may be arranged such that a wave interaction involving a wave device 420 reflects an interaction with place 416. For example, a wave device 420 may be a computing device located near and/or within a boundary of place 416 and/or configured to connect to other wave devices that are near and/or located within a boundary of place 416. Wave devices 415 may store a UID profile 418 that associates corresponding wave device 420 with unique identifier 417 and place 416.

In one example, place 416 may be a landmark (e.g., the Liberty Bell, the North Pole, the Washington Monument, the Golden Gate Bridge, etc.). A person (e.g., a person associated with the landmark, such as an authority employee, official, representative, etc.) may position a wave device 420 to interact with other wave devices that are located within a certain proximity to the landmark. In this way, wave device 420 may be involved in wave interactions that result from a person interacting with the landmark (e.g., visiting the landmark).

Wave interactions between a wave device 420 and another wave device (e.g., a wave device 410) may occur in a manner that is the same as or similar to the exemplary wave interactions described above with respect to wave devices 410 and 415. For example, in addition to the transmission and/or receipt of a unique identifier, wave interactions involving wave devices 420 may include transmission of a payload 419 stored as part of UID profile 418.

Payload 419 may include data to be transmitted to other wave devices to communicate additional information. For example, payload 419 may include a message to be transmitted to another wave device. In another example, payload 419 may include a UID receipt history that includes a list of unique identifiers received by wave device 420. Through transmission of payload 419 from a wave device 420 to another wave device, information associated with place 416 may be communicated to people through wave interactions. For example, wave device 420 may transmit historical information associated with a landmark to a tourist's wave device when the tourist reaches a landmark. The wave device may be configured to display the historical information on a display device for viewing by the tourist.

UID system 400 may also include objects associated with unique identifiers and wave devices. In one embodiment, an "object" may be any physical, identifiable object. In an exemplary embodiment, "object" may refer to a readily movable object, although the term is not limited thereto. Examples of objects that may be present in UID system 40 may include vehicles, retail products, historically-significant objects, and/or the like. In another example, an object may be a wave device.

As shown in FIG. 4, an object 421 may be associated with a unique identifier 422 (e.g., "UID04"). Unique identifier 422 may be "unique" to and exclusively identify object 421. Object 421 may also be associated with one or more wave devices 425. For example, wave devices 425 may be arranged such that a wave interaction involving a wave device 425 reflects an interaction with object 421. For example, a wave device 425 may be a computing device physically associated and/or in close proximity to object 421 such that interactions with object 421 (e.g., a person being near object 421) may be wave interactions between wave device 425 and another wave device associated with a person, entity, or place involved in the interaction. Wave devices 425 may store a UID profile 423 that associates corresponding wave device 425 with unique identifier 422 and place 421.

In one example, object 421 may be a vehicle. A person (e.g., a person associated with the vehicle, such as driver, owner, etc.) may position a wave device 425 to interact with other wave devices that are located within a certain proximity to the vehicle. In this way, wave device 425 may be involved in wave interactions that result from a person interacting with the vehicle (e.g., entering the vehicle, passing the vehicle on the street, etc.).

Wave interactions between a wave device 425 and another wave device (e.g., a wave device 410) may occur in a manner that is the same as or similar to the exemplary wave interactions described above with respect to wave devices 410, 415, and 420. For example, in addition to the transmission and/or receipt of a unique identifier, wave interactions involving wave devices 425 may include transmission of a payload 424 stored as part of UID profile 423.

Payload 424 may include data to be transmitted to other wave devices to communicate additional information. For example, payload 424 may include a message to be transmitted to another wave device. In another example, payload 419 may include a UID receipt history that includes a list of unique identifiers received by wave device 425. Through transmission of payload 424 from a wave device 425 to another wave device, information associated with object 421 may be communicated to people through wave interactions. For example, wave device 425 may transmit information identifying object 421 to a person that was near object 421 at a certain point in time.

The exemplary disclosed wave devices 410, 415, 420, and 425 may be embodiments of wave devices 110 and 120, configured to communicate with each other and with data collection device 140 via network 150. FIG. 4 further depicts this configuration. In this way, wave devices 410, 415, 420, and 425, as well as any other wave devices present in system 100, may communicate with each other in one or more wave interactions that may occur as a result of interactions between people, entities, places, and/or objects.

In an exemplary embodiment, wave devices 410, 415, 420, and 425 may operate in conjunction with data collection device 140 to record and store information associated with wave interactions that have occurred. For example, wave devices 410, 415, 420, and 425 may store as part of UID profiles 408, 413, 418, and 423 information associated with a wave interaction. For example, a wave device may store a unique identifier (which may include a received UID receipt history) received as a result of a wave interaction with another wave device.

In addition or alternatively, wave devices 410, 415, 420, and 425 may communicate with data collection device 140 to store information associated with wave interactions. As shown in FIG. 4, in some embodiments, data collection device 140 may include UID profiles 432, 434, 436, and 438, which may be respectively associated with unique identifiers 406, 411, 416, and 421. Data collection device 140 may communicate with wave devices 410, 415, 420, and 425 to share information associated with wave interactions. In one example, data collection device 140 may store as part of UID profiles 432-438 UID receipt histories associated with each respective unique identifier 406, 411, 416, and 421.

In another example, data collection device 140 may store as part of UID profiles 432-438 information that may be used to determine an action to be triggered based upon receipt of a unique identifier by a wave device. For example, UID profile 432 may include information that is used to determine an action to be triggered by wave device 410 based on a wave device 410 receiving unique identifier 411. In addition or alternatively, UID profile 413 may include information that is used to determine an action to be triggered by wave device 410 based on wave device 410 receiving unique identifier 411. In this way, information from multiple UID profiles may be combined to determine an action to be triggered. The information may include programs and/or data that may be transmitted to a wave device for performance of the triggered action. For example, the action may be the display of textual data and the information may include the textual data and instructions for displaying the textual data.

In addition, data collection device 140 (and/or a wave device 410, 415, 420, 426) may perform one or more processes to determine additional information based on information stored in associated with one or more UID profiles. For example, data collection device 140 may analyze a unique identifier in relation to another unique identifier to determine if there is a relationship between the underlying people, entities, places, and/or objects. In another example, data collection device 140 may search UID receipt histories to determine which UID profiles include a particular unique identifier.

Exemplary disclosed embodiments of system 100 and UID system 400 allow interactions between people, entities, places, and objects to take place as wave interactions through wave devices. Associating the people, entities, places, and objects each with a unique identifier allows the wave interaction to be a reflection of the interaction, since the transmission and/or receipt of a unique identifier may be directly related to the interaction. For example, an interaction may be a person coming into a close proximity to another person. Each person may possess a wave device, configured to automatically connect to each other and exchange unique identifiers. In this way, while the people may walk past each other without physically communicating, their wave devices may virtually "wave" to each other, reflecting and recording the fact that at that particular time, the two people were near each other.

Figure 5:
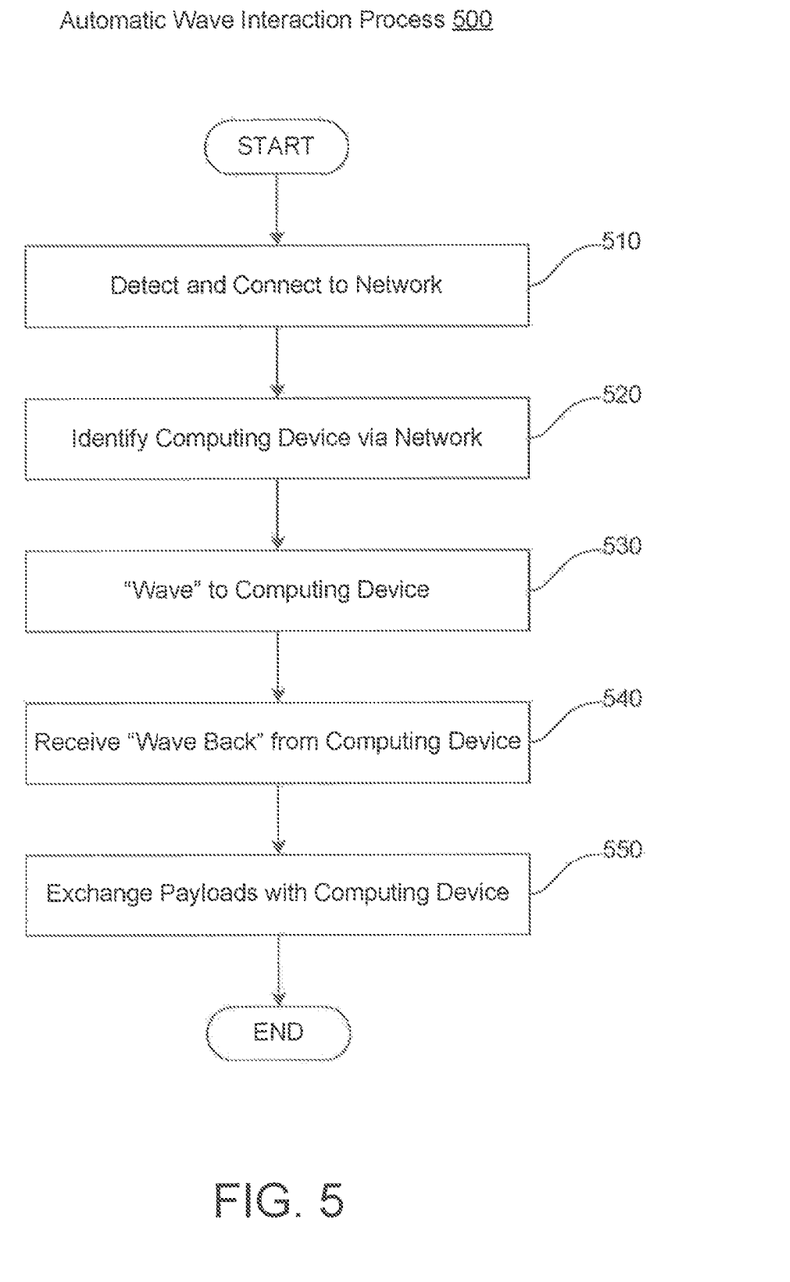
FIG. 5 is a flowchart of an exemplary automatic wave interaction process, consistent with disclosed embodiments.

FIG. 5 shows a flowchart of an exemplary automatic wave interaction process 500, consistent with disclosed embodiments. In one embodiment, wave device 110 may perform one or more operations of process 500 to perform a wave interaction with wave device 120. It should be understood that wave devices 110 and 120 may be any of wave devices 410, 415, 420, and 425, depending on the interaction that causes process 400. For example, wave devices 110 and 120 may be associated with unique identifiers associated with people.

Wave device 110 may detect and connect to a network (step 510). For example, one or more components of wave device 110 may be configured to receive network signals such that wave device 110 may detect that a network or direct connection is within range. As has been described, the network may be network 150, which may be a local connection using Bluetooth®, WIFI, or other conventional network. Wave device 110 may connect to the network in a conventional manner.

Wave device 110 may identify a computing device via the connected network (step 520). For example, wave device 119 may identify wave device 120 through network 150, which may be, for instance, a Bluetooth® connection or a WiFi connection. In an exemplary embodiment, wave device 110 may identify a computing device based at least in part on proximity between the devices. For example, wave device 110 may connect to wave device 120 when wave device 110 and wave device 120 are located within a certain proximity to each other (e.g., a proximity that results in a Bluetooth® connection, WiFi connection, NFC communication, etc. It should be understood that steps 510 and 520 encompass connections in which wave device detects and connects to another computing device without first detecting a network (i.e., detection and connection to another computing device constitutes detection and connection to a network). Once a connection is established, wave device 110 may attempt to communicate with wave device 120 to perform a wave interaction.

Wave device 110 may "wave" to wave device 120 (step 530). For example, wave device 110 may transmit a unique identifier associated with wave device 110 (hereinafter "UID110") to wave device 120. In addition, wave device 110 may look for a "wave back" from wave device 120. For example, wave device 110 may boost power to a communication device and look for a signal transmitted to wave device 110.

Wave device 110 may receive a "wave back" from wave device 120 (step 540). For example, wave device 110 may receive a unique identifier transmitted from wave device 120 to wave device 110. The received unique identifier may be a unique identifier associated with wave device 120 (hereinafter "UID120"). After step 540, wave device 110 may have received UID120 and wave device 120 may have received UID110.

In addition to exchanging unique identifiers, wave device 110 may exchange additional information with wave device 120 (step 550). For example, wave device 110 may transmit a payload to (hereinafter "outgoing payload") and receive a payload from (hereinafter "incoming payload") wave device 120. In an exemplary embodiment, the outgoing payload may include a UID receipt history associated with UID110 (e.g., a list of unique identifiers previously received by a wave device (e.g., wave device 110) as a result of a wave interaction involving UID110). Similarly, the incoming payload may include a UID receipt history associated with UID120 (e.g., a list or unique identifiers previously receive by a wave device (e.g., wave device 120) as a result of a wave interaction involving UID120.

In another example, the outgoing and incoming payloads may include one or more messages. The one or more messages may be, for example, textual data, image data, video data, audio data, program instructions, and/or the like. For example, wave device 110 may transmit an outgoing payload to wave device 120 that includes data and/or programs that wave device 120 may use to display a textual message to a user. The incoming payload may similarly include data and/or programs that wave device 110 may use to provide information to a user of wave device 110.

In some embodiments, wave device 110 (and/or wave device 120) may store a default payload to be transmitted to another device during a wave interaction. In other embodiments, wave device 110 (and/or wave device 120) may customize a payload to be transmitted to another device based on a unique identifier received. For example, wave device 110 may perform one or more processes to match a received unique identifier (e.g., UID120) to stored information and customize a message to be included in a payload to be sent to wave device 120.

After wave device 110 and wave device 120 exchange payloads, process 500 may end. As a result of process 500, wave device 110 may have received UID120, wave device 120 may have received UID110, and wave devices 110 and 120 may have exchanged payloads. In this way, two computing devices, such as mobile devices, may facilitate communication based on proximity to each other. For example, when two people are near each other (e.g., co-workers passing in the hallway), associated computing devices may connect to each other and complete a wave interaction to exchange unique identifiers and payloads as a result.

In addition, wave device 110 and/or wave device 120 may store information to record the wave interaction. For example, wave device 110 may record the time, date, and location of a wave interaction, as well as a received unique identifier (e.g., UID120) and a received payload, including a UID receipt history (e.g., by adding unique identifiers of the UID receipt history to a UID receipt history associated with wave device 110). As has been described, wave device 110 may store recorded information as part of a UID profile (e.g., a UID profile associated with UID110).

Further, wave device 110 may communicate with data collection device 140 to further use, store, and analyze information associated with a wave interaction. For example, wave device 110 may transmit information associated with one or more wave interactions to data collection device 140 over network 150 (e.g., via an Internet connection). Data collection device 140 may perform one or more processes with information received from wave device 110 (and/or another wave device).

Figure 6:
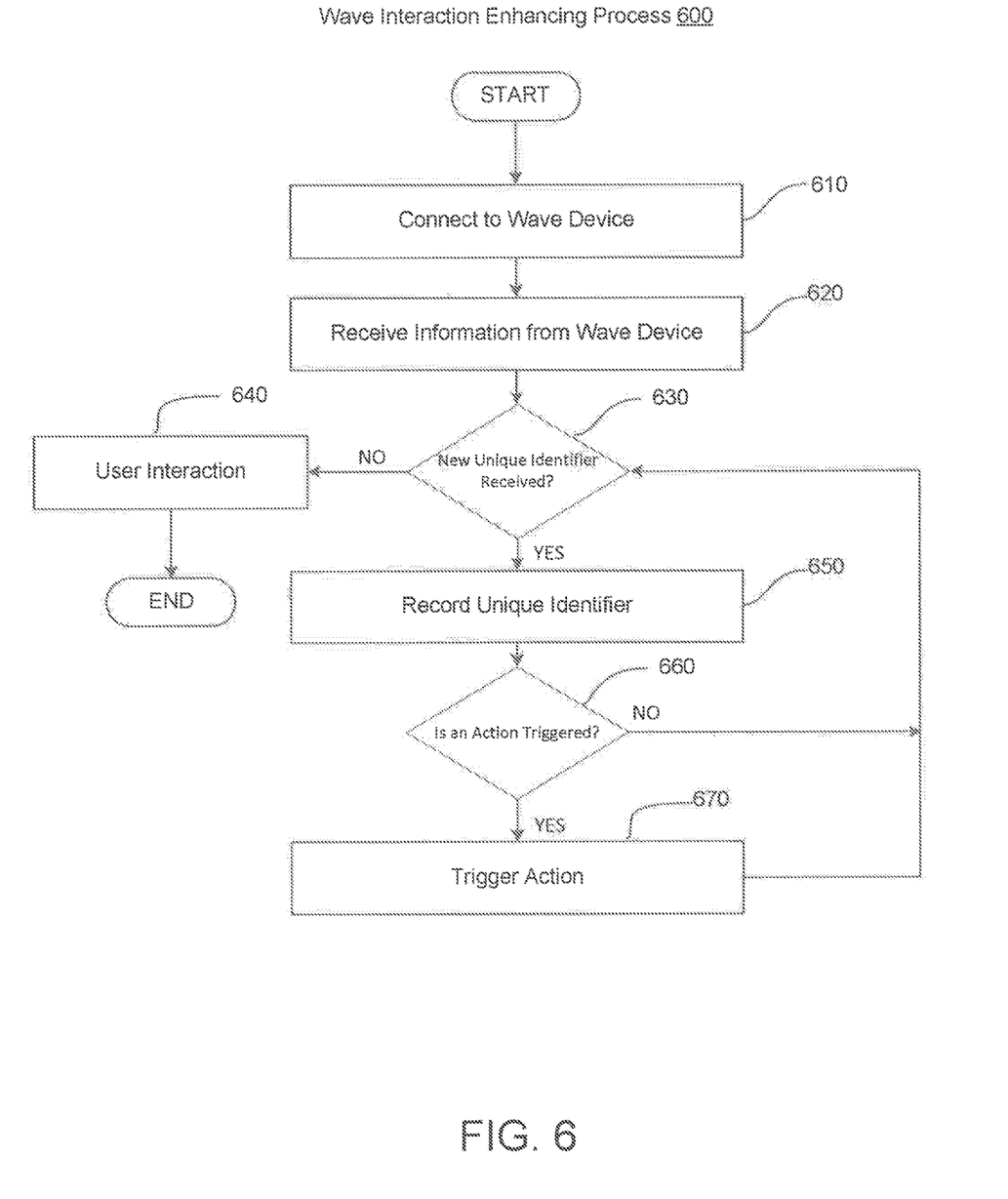
FIG. 6 is a flowchart of an exemplary wave interaction enhancing process, consistent with disclosed embodiments.

FIG. 6 depicts an exemplary wave interaction enhancing process 600, consistent with disclosed embodiments. In one embodiment, data collection device 140 may perform process 600 to provide enhanced functionality to wave interactions performed by one or more wave devices. For example, data collection device 140 may store information identifying when and where wave interactions occurred and use stored information to provide one or more utilities using the information.

Data collection device 140 may connect to wave device 110 (step 610). For example, data collection device 140 and wave device 110 may connect to each other over network 150, which may include an Internet connection. After connecting, data collection device 140 may identify a UID profile that is associated with wave device 110 (e.g., UID profile 432). The UID profile may correspond to a person, entity, place, or object associated with wave device 110.

In addition, data collection device 140 may receive information from wave device 110 (step 620). In an exemplary embodiment, data collection device 140 may receive one or more unique identifiers that were received by wave device 110 during one or more wave interactions. In some embodiments, data collection device 140 may receive additional information, such as when and where each unique identifier was received, and whether a unique identifier was received as part of a "wave" or "wave back" or if it was part of a UIf) receipt history received as part of a payload. Data collection device 140 may use the unique identifiers to perform additional functions.

Data collection device 140 may analyze received information to determine if a new unique identifier has been received (step 630). A new unique identifier may be a unique identifier that is not part of a UID receipt history stored as part of the UID profile corresponding to wave device 110. The UID receipt history may include all unique identifiers previously received and added to the UID profile, excluding those that have since expired (unique identifiers may include associated expiration times, at which point a unique identifier may be removed from a UID receipt history). If a new unique identifier has not been received (step 630—NO), data collection device may stop process 600 and await instructions associated with user interaction with information stored by data collection device 140 (step 640).

If, however, a new unique identifier is found (step 630—YES), data collection device 140 may record the unique identifier with the UID profile (step 650). For example, data collection device 140 may add the new unique identifier to a UID receipt history stored as part of the UID profile. In this way, the UID receipt history may be updated to include unique identifiers that were received by wave device 110. In some embodiments, data collection device 140 may also synchronize the UID receipt history with a UID receipt history stored by wave device 110, including removing any expired unique identifiers from the UID receipt history stored by wave device 110. In this way, wave device 110 may store an updated UID receipt history for use in subsequent wave interactions (e.g., where the UID receipt history is transmitted to another device as part of a payload).

In addition or alternatively, data collection device 140 may match the new unique identifier to stored information to determine if an action is triggered (step 660). For example, data collection device 140 may match a received new unique identifier to a UID profile associated with the unique identifier. Data collection device 140 may analyze information stored as part of the UID profile to determine if an action should be triggered. An action that may be triggered, for example, may include data collection device 140 transmitting a message (e.g., data and/or programs) to wave device 110.

Data collection device 140 may determine whether an action should be triggered based on information stored as part of a UID profile associated with wave device 110 and/or a UID profile associated with the unique identifier determined to be new. For example, data collection device 140 may determine an action should be triggered based on a relationship between the people, entities, places, and/or objects associated with the corresponding unique identifiers. For instance, data collection device 140 may determine that a new received unique identifier is associated with a person that is a friend of a person associated with wave device 110 (e.g., since the person is in a contact list stored in wave device 110). Data collection device 140 may determine that an action should be triggered to transmit information (e.g., instructions for triggering the action) to wave device 110 to allow wave device 110 to indicate to a user that they were involved in a wave interaction with the friend (e.g., "You walked near your friend on Main Street at 3:00 p.m.").

If data collection device 140 determines that no action is triggered by a received unique identifier (step 660—NO), data collection device 140 may return to analyzing the received unique identifiers to determine if any others are new. If data collection device 140 determines that an action is triggered by a received unique identifier (step 660—YES), data collection device 140 may trigger the action (step 670). For example, data collection device 140 may transmit instructions to wave device 110 to for triggering the action, which may include information to be displayed to a user. The information may include, for example, an identity of persons, entities, places, and/or objects associated with unique identifiers that were received. For example, wave device 110 may receive and provide links to social media profiles, websites, etc. associated with the persons, entities, places, and/or objects identified as being associated with a received unique identifier.

Data collection device 140 may then determine whether any other received unique identifiers are new. This cycle may repeat until all new unique identifiers are found and any corresponding actions are triggered. In this way, a user of wave device 110 may be provided with context to the various interactions that occurred during a particular time period. For example, wave device 110 may indicate people that a user was close to, entities that the user interacted with, places the user visited, and/or objects the person was near. Data collection device 140 may subsequently await instructions corresponding to user interaction.

Through exemplary process 600, data collection device 140 may provide additional functionality to UID system 400. For example, enhanced functions may be made possible and/or more feasible since data collection device 140 may be a server or other computing device that includes sufficient memory to store multiple UID profiles. In this way, information associated with multiple UID profiles may be combined to determine an action to be triggered based on a wave device associated with one unique identifier receiving a different unique identifier through a wave interaction. In addition, UID receipt histories may be maintained and stored in a central location, allowing all received unique identifiers to be included (even though multiple wave devices may have received them).

In some instances, data collection device 140 may receive a unique identifier as a result of an automatic wave interaction process, such as process 500. However, it should be understood that data collection device 140 may receive a unique identifier associated with a non-automatic wave interaction. For instance a user may operate wave device 110 and input information associated with an interaction that previously occurred. For example, the user may input information indicating that he or she was present at a meeting earlier in the day, providing identifying information associated with the meeting (e.g., when and where the meeting occurred, others present at the meeting, and/or a unique identifier associated with the meeting). Wave device 110 may receive or determine a unique identifier associated with the meeting (e.g., a unique identifier associated with a room in which the meeting occurred), which may constitute a wave interaction. Wave device 110 may transmit this unique identifier, as well as other input information, to data collection device 140 as part of process 600. In this way, if an interaction occurs but a wave device does not automatically perform a wave interaction (e.g., because the wave device is not present at the time or is not functioning properly), information associated with the interaction may be manually provided.

In one aspect, one or more computing devices may perform processes 500 and/or 600 to record information associated with interactions that occur between persons, entities, places, and/or objects. For example, a person associated with and carrying wave device 110 may pass another person associated with and carrying wave device 120. Wave device 110 and wave device 120 may connect to each other and perform a wave interaction, such as that described with respect to process 500. Each wave device 110, 120 and/or data collection device 140 may record information associated with the wave interaction, including a date, time, and place at which the underlying interaction occurred. In this way, each person may access information indicating that they were near the other person, even though they may not have been aware of it. As these interactions occur across many wave devices, a complex database of wave interactions may be created, allowing for various functions that may not otherwise be possible.

In one example, an entity (e.g., a business, school, etc.) may use one or more wave devices to track attendance at certain events. For instance, a business may position a wave device in a conference morn. As employees enter the conference room, wave devices associated with the employees may perform wave interactions with the conference room wave device. In this way, the interaction of the employee with the conference room may be recorded, along with the time and date of the meeting, such that a list of meeting attendees may be stored and subsequently accessed by users associated with the entity (e.g., management, the employees, etc.).

Similarly, one or more computing devices may combine information recorded as a result of a wave interaction with other information to provide a user with information regarding interactions that occur throughout their day. For example, a user may operate a wave device to connect the wave device to data collection device 140, which may associate received unique identifiers with identities of persons, entities, places, and/or objects. These identities may be provided back to the wave device and displayed, allowing the user to learn and/or be reminded of interactions with which they were involved.

Further, the association of unique identifiers with entities, places, and objects allows for more complex wave interactions to occur, encompassing interactions that may only involve one person. For example, customers that enter a retail store, tourists that visit a monument, and passengers that enter vehicles may constitute interactions, allowing for more wave interactions to occur and additional information to be recorded and used in subsequent analyses.

In addition, the transmission and receipt of UID receipt histories as part of a wave interaction may allow a unique identifier to travel throughout several wave interactions. For example, a unique identifier associated with a first person may be initially transmitted to a wave device associated with a second person when the two people walk past each other. The wave device associated with the second person may add the unique identifier to a UID receipt history, which may be transmitted to another wave device during a subsequent wave interaction. For example, the second person may visit a retail store of an entity that is associated with a wave device. The entity's wave device may perform a wave interaction with the wave device associated with the second person, receiving the unique identifier associated with first person as a result (via the UID receipt history). The entity's wave device may subsequently transmit the first person's unique identifier to another wave device, such as a wave device associated with yet another person (e.g., another customer in the store). This process may continuously repeat such that the first person's unique identifier is received by many wave devices through different wave interactions, until the first person resets their unique identifier or it expires.

Further, the disclosed embodiments avow for a broad range of applications that utilize wave interactions as a means to facilitate communication. In particular, the recording of information associated with wave interactions, including the transmission of payloads that include UID receipt histories, allows a device to track a unique identifier as it is used in various wave interactions. For example, a user may operate a wave device (or other computing device) to access an associated UID profile stored by data collection device 140. As wave interactions involving a unique identifier associated with the user occur, information associated with those wave interactions may be stored as part of the UID profile. The user may operate the wave device to communicate with data collection device 140, and provide instructions to analyze the UID profile for specific information.

For example, data collection device 140 may analyze the UID profile to calculate statistics associated with the user's unique identifier. The statistics may include, for example, information associated with unique identifiers stored as part of the UID profile's UID receipt history. The statistics may indicate, for example, that the UID receipt history includes a certain number of unique identifiers associated with particular categories, such as the number of friends of the user, the number of co-workers of the user, the total number of unique identifiers received, etc. The statistics may also include information associated with the number of unique identifiers.

In another example, data collection device 140 may analyze the UID profile to identify unique identifiers that were received as part of a wave or wave back and not only as part of UID receipt history (indicating that the unique identifier is associated with a person, entity, place, or object with which the user interacted), and to determine whether there is a relationship between those persons, entities, places, or objects and the user warranting the providing of additional information. For example, data collection device 140 may identify received unique identifiers associated with matchmaking profiles that are a match for the user's matchmaking profile. Data collection device 140 may provide a notification to a wave device to inform the user of the match and allow the user to follow up (e.g., send a message) if desired. In this way, additional interaction between people that previously interacted (even if unknowingly) may be encouraged and effectiveness of certain interactions (e.g., online dating) may be improved.

Even further, data collection device 140 may determine information associated with wave devices that correspond to UID profiles that currently include UID receipt histories that include the user's unique identifier. For example, data collection device 140 may identify that a user's unique identifier, through one or more wave interactions, has made its way to a wave device associated with a particular place (e.g., the Eiffel Tower). In another example, data collection device may determine that the unique identifier is in a UID receipt history associated with a wave device associated with a person and that that wave device is located in a particular location (e.g., at a concert venue). Data collection device 140 may identify this information and may provide it to a wave device for display (e.g., to the user associated with the unique identifier).

In addition, data collection device 140 and/or any number of wave devices may be used in one or more wave interaction activities. For example, a group of people may implement a "race" to determine whose unique identifier will arrive at a particular location first. Each unique identifier may take a path to the location through wave devices, as the unique identifier is transmitted through wave devices in wave interactions as part of a UID receipt history. Data collection device 140 may track the "race" and notify wave devices of the results. The "race" may include data collection device 140 analyzing information associated with wave interactions between wave devices that have already been established and/or wave interactions that will occur after the "race" begins. A similar wave interaction activity may include tracking a unique identifier as it is transmitted to a specific wave device, such as to determine how many wave interactions are needed for the specified destination to be reached.

In another exemplary wave interaction activity, a virtual "sonar ping" may be conducted. The "sonar ping" may include data collection device 140 determining a boundary around a location of some or all wave devices that have received a particular unique identifier. In this way, data collection device 140 may provide a user with a graphical representation of how far their unique identifier has "traveled".

Data collection device 140 may allow for additional functionality that further allows a user to manage their unique identifier. For example, data collection device 140 may be configured to "reset" a unique identifier, such as to remove the unique identifier from at least some UID receipt histories. In this way, a unique identifier may be re-used in one or more wave interaction activities, such as those described above, which may not otherwise be possible or practical because of the unique identifiers presence in one or more UID receipt histories.

Through the exemplary disclosed embodiments, computing devices may communicate with each other through wave interactions that reflect underlying interactions between people, entities, places, and objects. The wave interactions may be recorded and used in one or more processes to provide users with information related to interactions that occurred, whether or not they were aware of or even involved in the interaction.

The exemplary disclosed embodiments describe systems and methods for using a unique identifier to facilitate communication. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system comprising:
   one or more memory devices storing information and instructions; and
   one or more processors configured to execute the instructions to perform operations comprising:
      storing an interaction history associated with a first wave device or a user of the first wave device, the interaction history comprising a set of unique identifiers corresponding to a set of wave devices as part of wave interactions with the set of wave devices, the first wave device corresponding to a first unique identifier; and
      in connection with a first wave interaction between the first wave device and a second wave device:

obtaining, from the first wave device, an interaction update indicating the first wave interaction and one or more other wave interactions between the first wave device and one or more other wave devices;

updating, based on the interaction update, the interaction history to add, to the interaction history, a second unique identifier corresponding to the second wave device and one or more unique identifiers corresponding to the one or more other wave devices such that the updated interaction history comprises the second unique identifier and the one or more other unique identifiers, and the set of unique identifiers; and transmitting, to the second wave device, a profile based on the updated interaction history, the profile comprising information related to wave interactions between multiple wave devices and triggering instructions for triggering an action related to the wave interactions between the multiple wave devices, wherein the second wave device performs the action based on the triggering instructions.

2. The system of claim 1, wherein obtaining the interaction update from the first wave device comprises obtaining the second unique identifier as part of the interaction update from the first wave device.

3. The system of claim 1, wherein transmitting the profile to the second wave device comprises transmitting the updated interaction history as part of the profile to the second wave device.

4. The system of claim 1, the operations further comprising:

transmitting, to the first wave device, a second profile based on the updated interaction history, the second profile comprising other information related to the wave interactions between the multiple wave devices and other triggering instructions for triggering another action related to the wave interactions between the multiple wave devices.

5. The system of claim 1, wherein the action comprises presentation of an alert related to the wave interactions between the multiple wave devices.

6. A method comprising:

storing, by one or more processors, an interaction history associated with a first wave device or a user of the first wave device, the interaction history comprising a set of unique identifiers corresponding to a set of wave devices as part of wave interactions with the set of wave devices, the first wave device corresponding to a first unique identifier;

in response to a first wave interaction between the first wave device and a second wave device, obtaining, by one or more processors, from the first wave device, an interaction update indicating the first wave interaction and one or more other wave interactions between the first wave device and one or more other wave devices;

updating, by one or more processors, based on the interaction update, the interaction history to add, to the interaction history, a second unique identifier corresponding to the second wave device such that the updated interaction history comprises the second unique identifier and the set of unique identifiers; and transmitting, by one or more processors, to the second wave device, a triggering message based on the updated interaction history, the triggering message comprising information related to wave interactions between multiple wave devices and triggering instructions for triggering an action related to the wave interactions between the multiple wave devices, wherein the second wave device performs the action based on the triggering instructions.

7. The method of claim 6, wherein obtaining the interaction update from the first wave device comprises obtaining the second unique identifier as part of the interaction update from the first wave device.

8. The method of claim 6, wherein transmitting the triggering message to the second wave device comprises transmitting the updated interaction history as part of the triggering message to the second wave device.

9. The method of claim 6, wherein updating the interaction history further comprises removing one or more unique identifiers from the interaction history based on one or more expiration times associated with the one or more unique identifiers.

10. The method of claim 6, wherein, as part of the first wave interaction, the first wave device (i) obtains the second unique identifier from the second wave device and (ii) transmits the first unique identifier to the second wave device.

11. The method of claim 6, further comprising:

transmitting, to the first wave device, a second triggering message based on the updated interaction history, the second triggering message comprising other information related to the wave interactions between the multiple wave devices and other triggering instructions for triggering another action related to the wave interactions between the multiple wave devices.

12. The method of claim 6, wherein the action comprises presentation of an alert related to the wave interactions between the multiple wave devices.

13. A non-transitory computer-readable medium storing instructions, that when executed by one or more processors, cause operations comprising:

storing an interaction history comprising a set of unique identifiers corresponding to a set of wave devices as part of wave interactions with the set of wave devices;

in response to a first wave interaction between a first wave device and a second wave device, obtaining, from the first wave device, an interaction update indicating the first wave interaction and one or more other wave interactions between the first wave device and one or more other wave devices;

updating, based on the interaction update, the interaction history to add, to the interaction history, a second unique identifier corresponding to the second wave device such that the updated interaction history comprises the second unique identifier and the set of unique identifiers; and transmitting, to the second wave device, a triggering message based on the updated interaction history, the triggering message comprising information related to wave interactions between multiple wave devices and triggering instructions for triggering an action related to the wave interactions between the multiple wave devices, wherein the second wave device performs the action based on the triggering instructions.

14. The medium of claim 13, wherein obtaining the interaction update from the first wave device comprises obtaining the second unique identifier as part of the interaction update from the first wave device.

15. The medium of claim 13, wherein transmitting the triggering message to the second wave device comprises transmitting the updated interaction history as part of the triggering message to the second wave device.

16. The medium of claim 13, wherein updating the interaction history further comprises removing one or more unique identifiers from the interaction history based on one or more expiration times associated with the one or more unique identifiers.

17. The medium of claim 13, wherein, as part of the first wave interaction, the first wave device (i) obtains the second unique identifier from the second wave device and (ii) transmits the first unique identifier to the second wave device.

18. The medium of claim 13, the operations further comprising:
   transmitting, to the first wave device, a second triggering message based on the updated interaction history, the second triggering message comprising other information related to the wave interactions between the multiple wave devices and other triggering instructions for triggering another action related to the wave interactions between the multiple wave devices.

19. The medium of claim 13, wherein obtaining the interaction update from the first wave device comprises obtaining the second unique identifier as part of the interaction update from the first wave device.

20. The medium of claim 13, wherein the action comprises presentation of an alert related to the wave interactions between the multiple wave devices.

\* \* \* \* \*